(No Model.) 2 Sheets—Sheet 2.
N. A. CHRISTENSEN.
GOVERNOR VALVE FOR AIR COMPRESSORS.
No. 598,283. Patented Feb. 1, 1898.
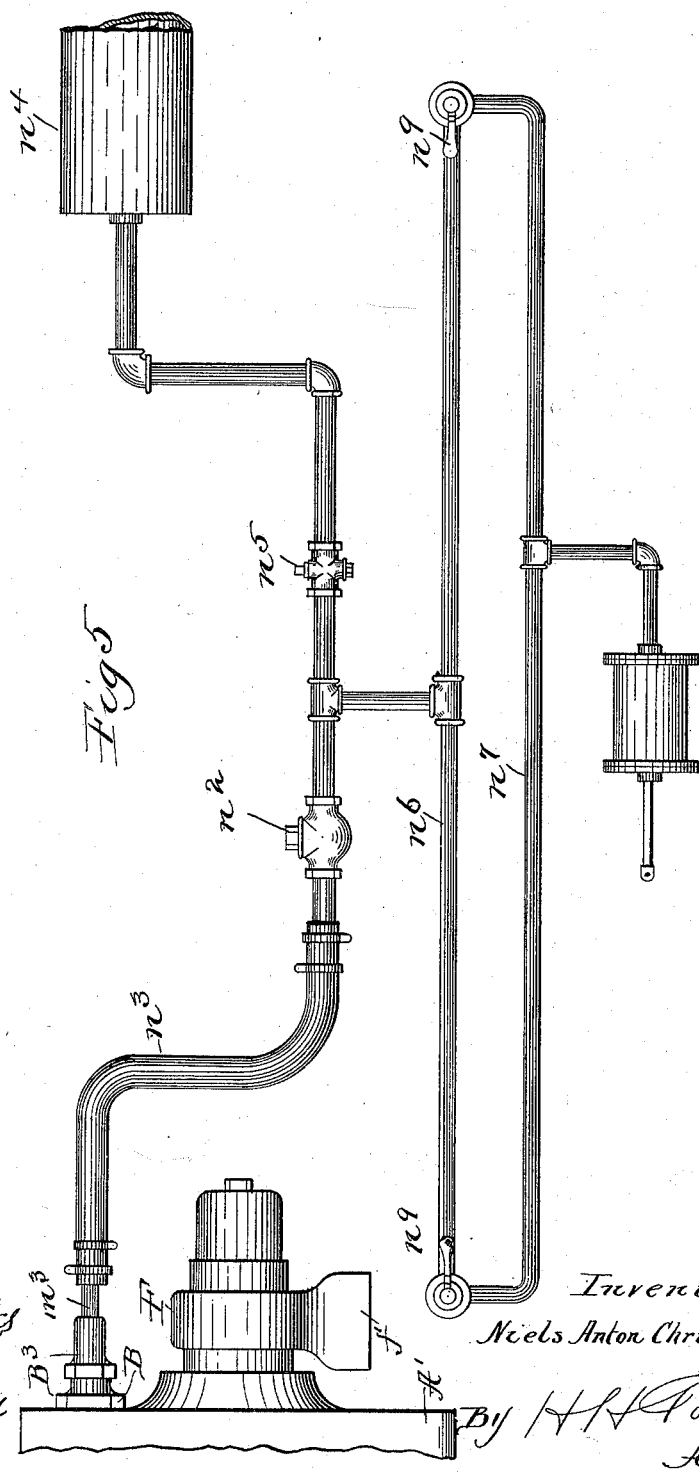

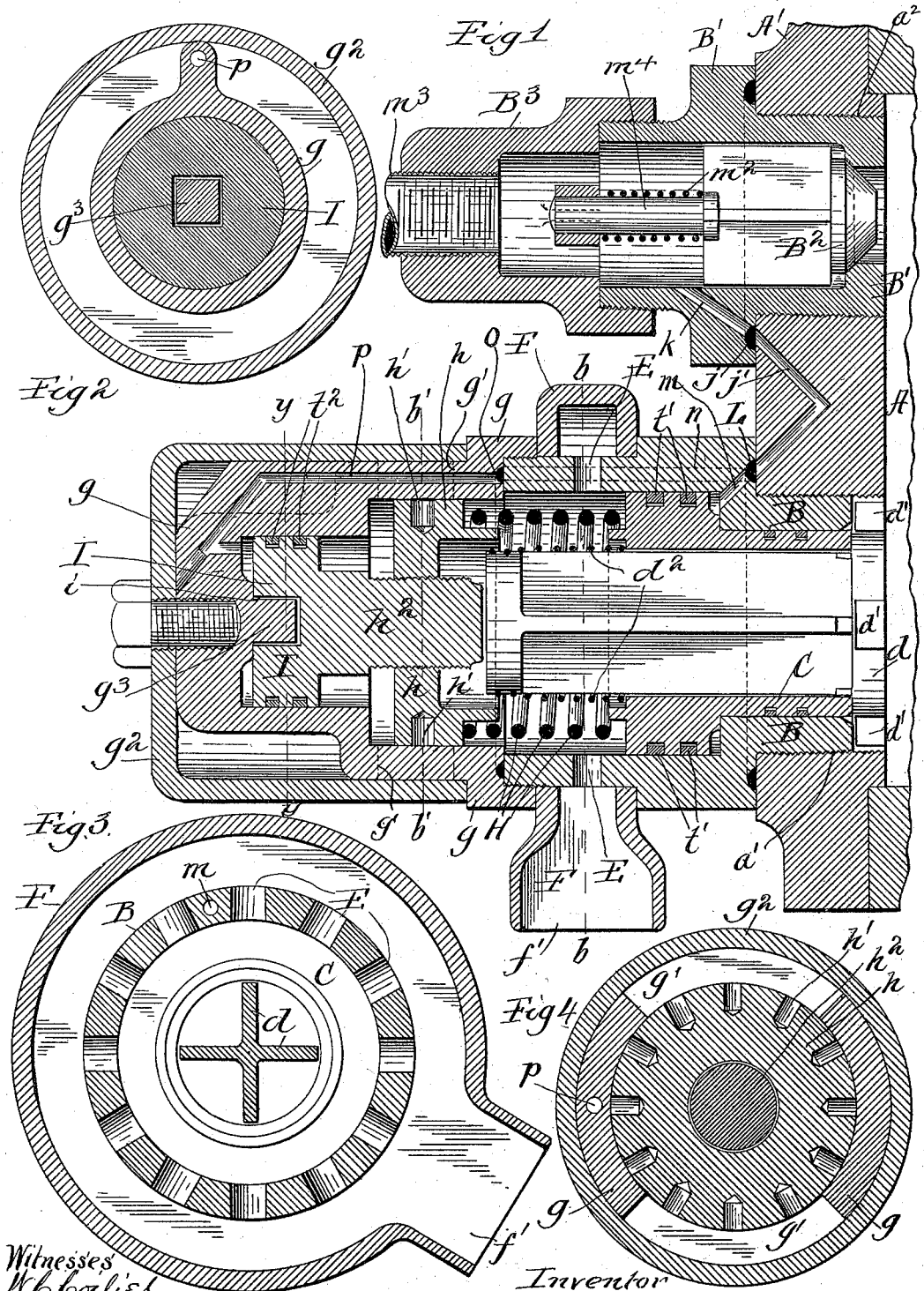

UNITED STATES PATENT OFFICE.

NIELS ANTON CHRISTENSEN, OF MILWAUKEE, WISCONSIN.

GOVERNOR-VALVE FOR AIR-COMPRESSORS.

SPECIFICATION forming part of Letters Patent No. 598,283, dated February 1, 1898.

Application filed November 7, 1895. Serial No. 568,184. (No model.)

*To all whom it may concern:*

Be it known that I, NIELS ANTON CHRISTENSEN, a subject of the King of Denmark, residing at Milwaukee, in the county of Milwaukee and State of Wisconsin, have invented certain new and useful Improvements in Governors and Valves for Air-Compressors, which are fully set forth in the following specification, reference being had to the accompanying drawings, in which—

Figure 1 represents a section of a valve embodying my invention with a portion of the cylinder to which it is attached. Fig. 2 represents a cross-section taken on the line $y\ y$ of Fig. 1. Fig. 3 is a cross-section taken on the line $b\ b$ of Fig. 1. Fig. 4 is a cross-section taken on the line $b'\ b'$ of Fig. 1; and Fig. 5 is a diagrammatic figure of the pipe system, pump, and reservoir.

My invention relates to means for regulating the pressure in air-reservoirs, and is more especially designed for air-reservoirs used in connection with air-pump apparatus in airbrakes for street-cars. The invention is designed to regulate such pressure so that it cannot be carried beyond a certain degree; and it consists of devices actuated by pressure from the said air-reservoir when the pressure reaches a certain point, whereby the suction-valve of the pump is unseated and the pump rendered inoperative to force air to the reservoir. This general result I have heretofore obtained by means described and shown in my prior applications, Serial No. 467,158, filed March 22, 1893, and Serial No. 542,379, filed March 19, 1895, and others. In the said prior inventions the result mentioned above is effected by providing a movable seat for the suction-valve, which is drawn from the valve by devices actuated by air-pressure, and also providing devices by which the valve is held from its seat and devices by which both the suction-valve and its seat are actuated by the pressure and kept apart as soon as the pressure in the air-reservoir has reached a certain determined intensity. In my present invention I effect this result by means of devices acting directly upon the suction-valve, forcing it away from its seat, and by other devices drawing the seat away from the valve when the pressure has reached a certain point.

I will now describe in detail the construction and operation of this mechanism.

Like letters refer to like parts in the different figures.

In the drawings, A represents the air-pump cylinder, only a small section being shown at the suction end thereof, and A' the cylinder-head or back cover secured thereto, as is usual in such devices, and provided with apertures $a'$ and $a^2$, the first aperture for the suction-valve case B and the latter for the discharge-valve case B'.

As before stated, B represents the suction-valve case, and C is a movable bushing mounted within said case B and adapted to be moved lengthwise within the said case. At its smaller end the bushing C forms the seat for the suction-valve $d$, the said bushing being bored out at its smaller end for the purpose of receiving the suction-valve $d$. The other end of the said bushing C is enlarged, the enlarged portion also moving air-tight in the case B, this part of the said bushing having suitable packing $t'$, as shown in Fig. 1. The suction-valve $d$ is formed with a solid head on each end. The larger head, which rests upon the bushing C, is provided with lugs $d'$, as shown in Fig. 1, while the smaller head is provided with threads for receiving a light spiral spring $d^2$, securely fastened to said head. The case B is also provided with a series of radial holes E E, as shown in Figs. 1 and 3, opening directly into the suction-valve chamber and on the outside of the case B into an annular chamber F, having a spout $f'$ on one side for attaching a suction-hose. The said chamber, with the spout, is adapted to swivel on part of the case B, being held between shoulders formed on the case B and its cap $g$, as hereinafter described.

The cap $g$ is formed to receive the outer end of the case B, to which it is securely fastened. The inner end of this cap $g$ has a disk $h$, as shown in Figs. 1 and 4, sliding in it, the said disk having radial holes $h'$ and being screw-threaded in the center for receiving a correspondingly-threaded piston-rod $h^2$, as hereinafter described. The cap $g$ has also openings $g'$, as shown in Figs. 1 and 4, cut in its side opposite the holes $h'$ in the disk $h$ when in position, the object being to turn the said disk for the purpose of regulating the pressure, as hereinafter described.

H is a regulating coil-spring interposed between the bushing C and the disk $h$.

I is a piston within the cap $g$, said piston having the screw-threaded rod $h^2$, hereinbefore referred to, fitting in the disk $h$. The piston I works air-tight in the cap $g$, being provided with proper packing $i^2$, as shown in Fig. 1. The piston I has at its rear end a square hole $i$, into which a projection $g^3$, formed on the cap $g$, fits, as shown in Fig. 2, for the purpose of preventing the said piston I from turning when adjusting the pressure by the disk $h$, as before described. A second cap $g^2$ is arranged to cover the cap $g$ and the openings $g'$ in its side, as before referred to. The second cap $g^2$ is fastened to the cap $g$ by any suitable means.

I have shown in the drawings a discharge-valve and case at the side of the suction-valve, both constituting a part of my apparatus. This valve and valve-case need only be briefly described here.

B' is the valve-case, as before stated.

$B^2$ is the discharge-valve, of any ordinary construction of winged valves. The valve $B^2$ has its seat in the case B' and is held to its seat by a spiral spring $m^2$, which spring encircles the stem $m^4$ of the valve and is held between an enlargement of said stem and a ledge in the cap $B^3$, which cap is screwed onto the discharge-valve case B' or fastened to it in some air-tight manner.

$m^3$ is a pipe extending through the cap $B^3$ and leading from the valve $B^2$ to the air-reservoir, which is not shown here, as it is no part of my invention.

For the purpose of carrying the compressed air to suitable parts of these devices, so that they may work in the manner intended, a hole $k$ is drilled in the discharge-valve case B' and terminates in a circular groove $j$ at the base of the discharge-valve case B'. Another hole $j'$ is drilled into the cover A' and communicates with the circular groove L at the base of the valve-case B. A hole $m$ is drilled into the annular space between the bushing C and the case B. Another hole $n$ is drilled longitudinally in the case B and opens into a circular groove O in cap $g$, from whence a hole $p$ is drilled to communicate with the piston I at its outer end.

In Fig. 5 I have shown the piping leading from the pump-cylinder to the air-reservoir and to the brake-cylinder and the pipes connected up to the controlling devices for the purpose of illustrating the utility of the device hereinafter described. It has been found in the actual working of an air-brake apparatus connected with street-cars that when the car is at rest it is impossible in an apparatus of such construction, with sliding piston, to hold all the compressed air in the reservoir. Some of it will leak out. To prevent this, I have devised in a former application a check-valve situated near the air-reservoir. This check-valve prevents the escape of air when the car is in use; but when the use of the car is discontinued for the day it is found that, notwithstanding this check-valve, a portion of the air will leak out through the controlling devices, and to prevent this I have devised a stop-cock which is placed nearer the air-reservoir than the check-valve and which prevents any of the air from escaping into any of the piping connected either with the pump or with the controlling mechanisms.

In Fig. 5, $n^2$ represents the check-valve, which has been described in a former application. $n^3$ represents the piping leading from the pump through the check-valve and into the air-reservoir $n^4$. Between the check-valve $n^2$ and the reservoir $n^4$ I have interposed in the pipe a stop-cock $n^5$ of any ordinary construction. This stop-cock must be worked by hand. When the car is not used and is taken into its barn or storehouse, a workman or attendant turns the stop-cock and prevents the escape of any of the air from the reservoir. When the car is about to be put into use, an attendant will turn the stop-cock so as to let the air into the various pipes. I have shown these pipes, as before stated, simply for the purpose of illustrating my invention, and they need not be further described here. The pipes $n^6$ and $n^7$ lead into the brake-cylinder and to the controlling mechanisms, which are operated by handles $n^9$.

The operation of the devices regulating the air-pressure is as follows: When the pump starts up, the air is compressed into the reservoir and the pressure of air will find its way through the hole $k$ in the discharge-valve casing and into the suction-valve casing and regulator mechanism, on which it acts in the following manner: It being understood that the area of the piston I in the cap $g$ is equal or nearly equal to the area of the difference between the small and the large diameter of the bushing C, it is obvious that as soon as the pressure of these two areas is equal to or more than the resistance of the spring H the bushing will move back and the piston move forward against the said spring, the rod $h^2$ of the piston I striking the inner head of the suction-valve D, thus causing the valve to move outwardly from its seat on the bushing C at the same time the bushing C, on account of the excess pressure, will move inwardly from the valve-head, which has its seat upon it, thus leaving the suction-valve $d$ open while an excess of pressure exists. Again, if the pressure in the reservoir is reduced the spring H will be stronger than the reduced reservoir-pressure on the annular ring and upon the piston I, at which time the spring H will force the bushing C and the piston I back into normal position, allowing the suction-valve to close, and air will be forced into the reservoir until the pressure is restored, when the same action will be repeated, as before described.

These general results have already been obtained by me, as set forth in my prior applications before mentioned; but my present invention differs in construction from the invention set forth in my prior applications, rendering the device more practical for general application and also involving new features.

Having thus described my invention, what I claim to be new, and desire to secure by Letters Patent, is—

1. In an air-pump apparatus, the combination with the suction-valve and means for positively moving the same from its seat, of a movable seat, passages admitting reservoir-pressure to the seat and valve moving means, to actuate them in opposite directions, and a spring interposed between the valve-seat and valve-moving mechanism in such a manner as to resist such pressure and bring such seat and valve back again into their normal positions when the excess pressure is removed, substantially as shown and described.

2. In an air-pump apparatus, a valve-case, a movable bushing in said valve-case forming a valve-seat and having an enlarged portion or ring surrounding it, a suction-valve within said bushing and having a seat on the outer end thereof, a cap on the end of said valve-case and securely fastened thereto, a piston within said cap having an area substantially equal to the area of the said ring on said bushing, a disk adjustably secured to said piston, and a spring interposed between the said disk and the said bushing, with openings or air-passages, so constructed as to deliver reservoir-pressure to operate upon said ring on said bushing and the end of said piston in such a manner as to cause said bushing and said piston to move in opposite directions by an excess pressure of air, the spring causing said parts to move back again into their normal position when such excess pressure is removed, substantially as shown and described.

3. In an air-pump apparatus, a suction-valve, a movable bushing surrounding said valve and forming a seat therefor, a piston having a rod adapted to engage with an end of said suction-valve and having an area on its outer surface substantially the same as the area of the outer portion of said bushing with suitable passages admitting the reservoir air-pressure to said piston and said bushing so as to cause them to move in opposite directions, and a spring interposed between said bushing and said piston to resist said reservoir-pressure and for the purpose of restoring said piston and said bushing to their normal position, substantially as shown and described.

4. In an air-pump apparatus, the bushing C having an enlarged part or ring on one end thereof, the valve $d$ having its seat on said bushing, in combination with the disk $h$, the piston I having a rod $h^2$ adapted to be secured to the disk $h$, and the cap $g$ having openings $g'$ cut in its side opposite holes $h'$ in the disk $h$, with means for preventing the piston I from turning while adjusting the disk $h$, substantially as shown and described.

5. In air-pump apparatus the combination of the valve-case B, valve $d$, spring H, piston I, disk $h$ adjustably attached to said piston and having openings $h'$ in its periphery, a cap $g$ containing said disk and piston and having openings $g'$ through which the openings $h'$ are accessible, and a cap $g^2$ fitted over the cap $g$ and secured thereto in such a manner as to close the adjustment-openings $g'$ and $h'$, substantially as shown and described.

6. In an air-pump apparatus, the combination of the discharge-valve case B' having suitable air-passages therein leading from the reservoir through said valve-case, and the valve-case B, bushing C and piston I, with suitable air-passages in said valve-case B connecting with the said air-passages in said valve-case B' so as to conduct the compressed air from the reservoir to the enlarged space at the end of the bushing C and to the outer end of the piston I so as to cause them to move in opposite directions, substantially as shown and described.

7. In air-pump apparatus the combination with a valve-case, of a suction-valve, a valve-seat movable away from said valve, pistons for simultaneously moving said valve and seat in opposite directions away from each other, a passage leading from the discharge connection of the pump to the outer ends of said pistons, and a spring interposed between said pistons and tending to move them apart against the fluid-pressure on their outer faces, whereby said valve and its seat are moved apart whenever the pressure by the pump reaches a certain point, and are restored to normal position whenever the pressure falls to or below that point, substantially as and for the purposes set forth.

NIELS ANTON CHRISTENSEN.

Witnesses:
JOHN R. COTTON,
EDW. E. FITZGERALD.